United States Patent

[11] 3,591,974

| [72] | Inventor | Ernest L. Thornell<br>East Aurora, N.Y. |
|---|---|---|
| [21] | Appl. No. | 805,314 |
| [22] | Filed | Mar. 7, 1969 |
| [45] | Patented | July 13, 1971 |
| [73] | Assignee | The Quaker Oats Company |

[54] MUSICAL TELEPHONE TOY
10 Claims, 4 Drawing Figs.

[52] U.S. Cl. .................................................. 46/33
[51] Int. Cl. ........................................... A63h 33/30
[50] Field of Search ..................................... 46/33, 189, 191, 192; 84/95

[56] References Cited
UNITED STATES PATENTS

| 1,638,327 | 8/1927 | Eckstein ..................... | 84/95 |
| 1,667,078 | 4/1928 | Patten ......................... | 84/95 |
| 2,059,603 | 11/1936 | Pflaum ........................ | 46/192 X |
| 2,633,769 | 4/1953 | Saks ........................... | 46/33 X |
| 2,634,647 | 4/1953 | Loeffler et al. ............... | 46/33 X |
| 3,170,359 | 2/1965 | Mourra ........................ | 84/95 X |

*Primary Examiner*—Louis G. Mancene
*Assistant Examiner*—D. L. Weinhold
*Attorney*—Cumpston, Shaw and Stephens ABSTRACT: A toy telephone is made to simulate a pushbutton telephone, and the buttons are arranged to drive a music unit. Also, a popup figure is arranged under a pivotal cradle for the receiver, and one of the buttons moves a cam that releases a latch to allow the figure to pop up from under the cradle.

PATENTED JUL 13 1971

INVENTOR
ERNEST L. THORNELL

BY Cumpston, Shaw
and Stephens

ATTORNEYS

PATENTED JUL 13 1971

INVENTOR.
ERNEST L. THORNELL

BY Crumpton, Shaw
and Stephens

ATTORNEYS

3,591,974

MUSICAL TELEPHONE TOY

THE INVENTIVE IMPROVEMENT

Toy telephones have long been popular, and the market place has responded to novel and creative variations in toy telephones. The objects of this invention include another such novel telephone combining play features in a new way. The inventive toy attempts pleasing sounds and appearances, a popup surprise, and a musical tune, all within the popular toy telephone structure. The toy also aims at ruggedness, durability, simplicity, safety, and reliability. The creative possibilities for manipulative play and pleasant sound give the toy educational value.

SUMMARY OF THE INVENTION

The inventive toy has a base, receiver, and cord, arranged to simulate a pushbutton telephone. The front face of the phone has a plurality of pushbuttons having actuator portions that extend through the front face. A slide is arranged under the front face with slots arranged to receive the actuator portions. The slide is biased in one direction and the actuator portions include cam surfaces disposed to engage sides of the slots for moving the slide against the bias when the buttons are pushed. The slide engages the movable pawl of a pawl-and-ratchet drive for stepped advancement of the ratchet, and a music device is driven by the ratchet for sounding a note for each of the stepped advances. Preferably, the buttons are arranged so that pressing any one of several buttons advances the slide to play one more successive note of the tune programmed into the music unit. Also the receiver cradle is pivotted, preferably at the back of the base, and a resilient figure is arranged under the cradle for popping up from under the cradle when the cradle is released. A latch holds the cradle down, and a latch slide arranged under the front face is operated by one of the pushbuttons for camming open the latch to release the cradle for popping up of the figure.

DRAWINGS

DETAILED DESCRIPTION

Figure 1:
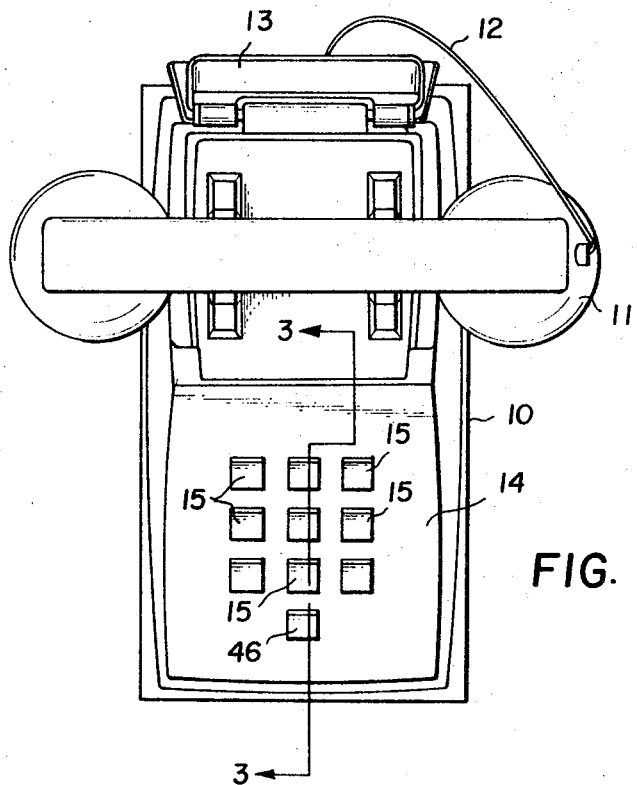
FIG. 1 is a plan view of a preferred embodiment of the inventive toy.

Base 10 of the preferred embodiment of the inventive toy illustrated in the drawings is preferably configured to simulate a pushbutton telephone. A receiver 11 is connected to base 10 by a cord 12. A carrying handle 13 is pivotally arranged at the back of base 10 for carrying the toy. The toy includes both a music device and a popup figure as described below.

MUSIC DEVICE

A plurality of pushbuttons 15 are arranged on the front face 14 of base 10 and extend through front face 14. The bottoms of pushbuttons 15 have actuator portions 16 including cam surfaces 17. Actuator portions 16 extend across a space between front face 14 and housing wall 18 fixed below front face 14. Apertures 19 in housing wall 18 receive the lower ends of actuator portions 16 of buttons 15. A block of resilient foam plastic material 20 is disposed below housing wall 18 to lightly resist depression of buttons 15.

Figure 3:
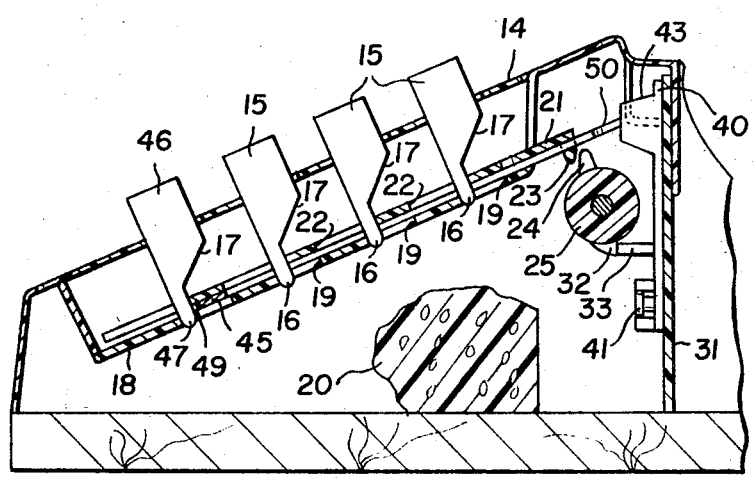
FIG. 3 is a cross section of a fragment of the inventive toy taken along the line 3-3 of FIG. 1.

A slide 21 is arranged between front face 14 and housing wall 18, and actuator portions 16 of buttons 15 extend through slots 22 in slide 21. The forward edges of slots 22 engage cam surfaces 17 and act as followers relative to cam surfaces 17 as buttons 15 are pushed down for moving slide 21 upward or to the right as illustrated in FIG. 3. The back surfaces of slots 19 engage and support buttons 15 against rearward thrust as their cam surfaces 17 engage the forward edges of slots 22.

The upper end of slide 21 has a finger 23 that engages lug 24 of pawl 25 to rotate pawl 25 on its axis against the bias of spring 26. Pawl 25 engages ratchet 27 which is coupled to shaft 28 and held against reverse rotation by engagement of its teeth with fixed lug or pawl 29. Shaft 28 is connected to a music device 30, mounted on plate 31 and programmed to sound a musical note for each stepped advance of ratchet 27. The friction of music device 30 also restrains ratchet 27 against reverse rotation.

Release of a down-pressed button 15 allows that button to move back upward under the bias of foam block 20 and spring 26 which drives pawl 25 and slide 21 back to their normally pressed positions as illustrated in FIG. 3. Stop lug 32 of pawl 25 engages a stop 33 on plate 31. Lug pawl 29 and music unit 30 hold ratchet 27 against such reverse rotation, so that the teeth of pawl 25 back up one tooth relative to the teeth of ratchet 27 so that a subsequent pushing down of a button 15 cams slide 21 against pawl lug 24 for a subsequent stepped advance of ratchet 27 and music device 30.

POPUP FIGURE

Cradle 35 for receiver 11 is pivotally mounted on pivot-axis 36 coaxially with handle 13. A popup figure 37 is disposed beneath cradle 35 and biased upward by a coil spring 38 mounted in base 10. A latch hook 39 is arranged near the forward edge of cradle 35 for holding cradle 35 down against the bias of spring 38 under figure 37.

A latch 40 is mounted on plate 31 for pivotal motion around lug 41. A spring 42 biases latch 40 toward latching engagement with hook 39 when cradle 35 is lowered. Latch 40 hooks over latch hook 39 to hold cradle 35 down. Latch 40 includes a cam follower 43.

Figure 2:
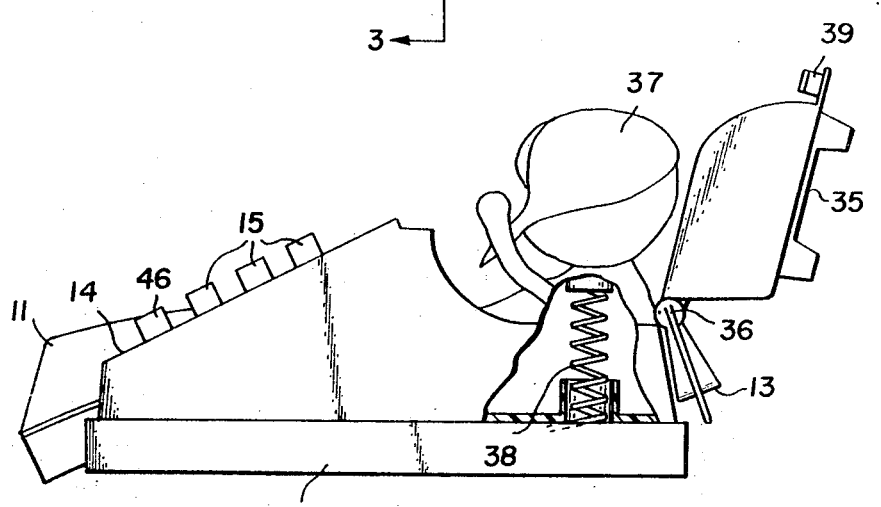
FIG. 2 is a partially cutaway side elevation of the toy of FIG. 1 showing the popup figure under the cradle.
Figure 4:
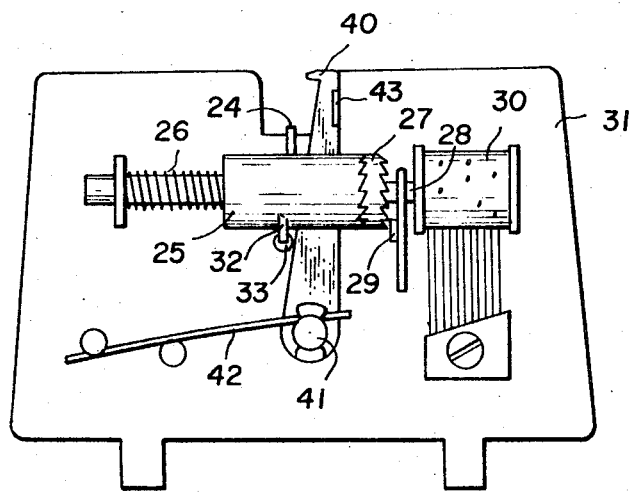
FIG. 4 is a front elevation of a panel in the inventive toy supporting the music unit and cradle latch.

A latch slide 45 is arranged beneath slide 21 in the space between front face 14 and housing wall 18. A pushbutton 46 on the front face 14 of base 10 has an actuator portion 47 and a cam surface 48 extending below front face 14 of the toy. A pushbutton 46 is depressed, cam surface 48 engages the lower end 49 of slide 45 to move slide 45 upward or to the right as illustrated in FIG. 3. This brings cam 50 on the upper end of slide 45 against cam follower 43 on latch 40 to pivot latch 40 clockwise as illustrated in FIG. 4 to release latch hook 39. Then cradle 35 pivots open clockwise as illustrated in FIG. 2, and figure 37 pops up from under cradle 35. The bias of spring 42 reflects back through follower 43 and slide 45 to raise button 46 when it is released. Several buttons 46 can be used to engage and cam slide 45 for releasing latch 40 if desired.

Thus it can be seen that the inventive toy accomplishes its objects in providing a rugged, musical, chime, telephone toy offering creative opportunities for manipulating push buttons and the popup figure.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, different arrangements of buttons, cams, pawl and ratchet drives, spring biases, and latch and pivot arrangements can be made within the spirit of the invention.

I claim:

1. In a toy telephone having a base, a receiver, and a cord connecting said receiver to said base, the improvement comprising:

a. the front face of said base having a plurality of pushbuttons;
   b. each of said pushbuttons having an actuator portion extending through said front face; said actuator portions having cam surfaces;
   c. a slide arranged under said front face;

d. said slide having a plurality of slots; arranged to receive said actuator portions;
e. said actuator portions extending respectively into said slots in said slide;
f. resilient means for biasing said slide in one direction;
g. said cam surfaces being disposed to engage sides of said slots for moving the edges of said slots and said actuator portions being configured relative to each other so that engagement between said slot edges and said actuator portions occurs along a line generally oblique to the direction of motion of said pushbuttons to effect a cam and follower relationship that moves said slide against said bias means whenever said buttons are pushed;
h. a movable pawl and ratchet drive;
i. said slide engaging and moving said pawl for stepped advancement of said ratchet; and
j. a music device driven by said ratchet for sounding a note for each of said stepped advances.

2. A toy of claim 1 including a fixed pawl arranged to limit said advance of said ratchet to one direction.

3. The toy of claim 1 wherein said bias means for said slide comprises a spring-biasing said movable pawl into engagement with said slide.

4. The toy of claim 1 including a block of resilient foam plastic material disposed beneath said slide for resiliently engaging said actuator portions of said buttons.

5. The toy of claim 1, including a cradle for said receiver pivotally mounted on said base; a resilient figure under said cradle arranged to bias said cradle pivotally upward; a spring-biased latch arranged for latching said cradle down; a latch slide arranged under said front face to be cammed against said latch by one of said pushbuttons for releasing said latch to allow said figure to pop up from under said cradle.

6. The toy of claim 5 wherein said cradle pivot is in the region of the back of said base and said latch is in the region of the forward edge of said cradle.

7. The toy of claim 6 including a carrying handle arranged coaxially with said cradle pivot.

8. The toy of claim 5 wherein said latch includes a cam follower and said latch slide includes a cam driven against said follower to release said latch.

9. The toy of claim 5 wherein said figure includes a coil spring.

10. The toy of claim 1 including a fixed, apertured wall arranged under said slide so said actuator portions of said pushbuttons extend into said apertures and bear against the edges of said apertures as said slide is moved.